(12) United States Patent
Dal Gazzo et al.

(10) Patent No.: US 11,668,493 B2
(45) Date of Patent: Jun. 6, 2023

(54) GAS HEATER, METHOD FOR OPERATING THE GAS HEATER AND A GAS BOILER

(71) Applicant: BDR Thermea Group B.V., Apeldoorn (NL)

(72) Inventors: Marco Dal Gazzo, Noale (IT); Sebastiano Temperato, Campolongo Sul Brenta (IT); Paolo Zannoni, San Giuseppe di Cassola (IT)

(73) Assignee: BDR THERMEA GROUP B.V., Apeldoorn (NL)

( * ) Notice: Subject to any disclaimer, the term of this patent is extended or adjusted under 35 U.S.C. 154(b) by 538 days.

(21) Appl. No.: 16/811,358

(22) Filed: Mar. 6, 2020

(65) Prior Publication Data

US 2020/0284473 A1 Sep. 10, 2020

(30) Foreign Application Priority Data

Mar. 8, 2019 (NL) ..................................... 2022704

(51) Int. Cl.
| | |
|---|---|
| *F24H 9/20* | (2022.01) |
| *F23D 14/62* | (2006.01) |
| *F23D 14/82* | (2006.01) |
| *F23L 13/00* | (2006.01) |
| *F16K 15/02* | (2006.01) |

(52) U.S. Cl.
CPC ............. *F24H 9/205* (2013.01); *F23D 14/62* (2013.01); *F23D 14/825* (2013.01); *F23L 13/00* (2013.01); *F16K 15/02* (2013.01)

(58) Field of Classification Search
CPC .... F23D 14/825; F23D 14/62; F23D 2209/10; F23D 14/82; F23D 14/02; F23L 13/00; F24H 9/205; F24H 9/2042; F24H 1/124; F24H 1/145; F24H 1/165; F16K 17/36; F16K 15/02; F23N 2235/02; F23N 2235/06; Y10T 137/1407
See application file for complete search history.

(56) References Cited

U.S. PATENT DOCUMENTS

| | | | |
|---|---|---|---|
| 3,933,444 A | 1/1976 | Kilgore | |
| 4,250,916 A * | 2/1981 | Hoffmann | ............... F16K 15/02 137/514.5 |

(Continued)

FOREIGN PATENT DOCUMENTS

| | | | | |
|---|---|---|---|---|
| DE | 19635974 A1 * | 3/1998 | ............. | F23D 14/36 |
| EP | 1 035 376 A1 | 9/2000 | | |

(Continued)

*Primary Examiner* — Nathaniel Herzfeld

(57) ABSTRACT

A gas heater includes a premix burner, a supply channel for supplying a mixture of a gaseous fuel and air to the burner, and a check valve placed in the supply channel upstream of the burner. The check valve includes a moveable valve body having a first end position in which the check valve is opened and a second end position in which the check valve is closed. In a first pressure condition in which a pressure upstream is higher than a pressure downstream, the valve body is urged to the first end position. In a second pressure condition in which the pressure upstream is lower than the pressure downstream the valve body is urged to the second end position. After closure of the check valve the check valve remains closed for a delay time.

18 Claims, 5 Drawing Sheets

(56) References Cited

U.S. PATENT DOCUMENTS

| | | | | |
|---|---|---|---|---|
| 2012/0227972 A1* | 9/2012 | Hande | ............... | F16K 15/06 |
| | | | | 166/324 |
| 2015/0044618 A1* | 2/2015 | Martin | ............ | F23D 14/125 |
| | | | | 431/189 |
| 2018/0128387 A1* | 5/2018 | Strongin | ............ | F16K 31/12 |
| 2018/0187921 A1* | 7/2018 | Ojiro | .................. | F23L 5/02 |
| 2020/0309412 A1* | 10/2020 | Ono | .................. | F23L 13/02 |
| 2021/0348755 A1* | 11/2021 | Bailey | ............ | B23K 26/389 |

FOREIGN PATENT DOCUMENTS

| | | | | |
|---|---|---|---|---|
| JP | 60049812 B | * | 11/1985 | ......... F23D 14/62 |
| WO | WO 2018/122574 A1 | | 7/2018 | |
| WO | WO-2019169363 A1 | * | 9/2019 | ........ F04B 1/0461 |

\* cited by examiner

GAS HEATER, METHOD FOR OPERATING THE GAS HEATER AND A GAS BOILER

FIELD

The invention relates to a gas heater for heating a fluid such as a gas or a liquid, a method for operating the gas heater, and a gas boiler comprising such a gas heater.

BACKGROUND

Gas heaters have numerous applications. One of the possible applications is the use of a gas heater in a boiler for heating water, e.g. for central heating and/or tap water heating. Conventional gas heaters are optimized to combust natural gas, which is a gaseous fuel primarily comprising methane ($CH_4$). A known gas heater comprises:
a premix burner having a burner deck; and
a supply channel fluidly connected to a supply of gaseous fuel, to a supply of air, and to the burner for supplying a mixture of the gaseous fuel and the air to the burner. The supply channel comprises a mixing area upstream of the burner in which area, in operation, the gaseous fuel and the air start to mix.

A premix burner has the advantage that the mixture of gaseous fuel and air is very uniform when it leaves the burner deck of the burner which leads to a very stable flame, low nitrogen oxides ($NO_x$) emissions and a high efficiency of the combustion process. Because of these advantages, virtually all natural gas heaters nowadays comprise a premix burner. In a premix burner the combustible mixture which is fed to the burner is also present in a supply channel upstream of the burner.

SUMMARY OF THE INVENTION

One of the main resulting flue gasses of combusting natural gas is carbon dioxide ($CO_2$). Carbon dioxide is a so-called greenhouse gas, and considered to be one of the main contributors to global warming. Because of this, there is an ongoing search to replace natural gas as fuel for a gas heater. One such solution is to use hydrogen ($H_2$) as a gaseous fuel. Hydrogen has the advantage that it can be made from water ($H_2O$), making the supply virtually unlimited. Furthermore, the flue gases are mainly nitrogen ($N_2$), water vapour and oxygen ($O_2$) and when the water vapour is condensed there is zero emission of greenhouse gasses.

Using hydrogen leads to new challenges. The mixture is fed through the burner deck of the burner with a certain mixture velocity. The mixture will combust or burn with a certain flame speed. The flame speed is the measured rate of expansion of the flame front in a combustion reaction. For the flame to stay in substantially the same place with respect to the burner, i.e. at a fixed distance of the burner deck, the mixture velocity has to be balanced with the flame speed. With an imbalance between the mixture velocity and the flame speed, the flame may propagate in the direction of the burner deck. In fact, the flame will 'eat its way back' to the burner deck, across the burner deck into the burner and the mixture supply channel. This is known as a flashback. Due to the very high flame speed of a hydrogen mixture, the occurrence of flashback is much more likely than when burning a natural gas mixture of which the flame speed is considerably lower. Flashback can be triggered e.g. by a change in a ratio of the gaseous fuel to the air in the mixture, by a change in composition of the gaseous fuel, or by a change in pressure in the combustion chamber, e.g. caused by a pressure drop at the outlet of a flue channel caused by wind or other natural causes. Flashback may also be triggered by high local temperatures of the burner surface.

When a flashback occurs the flashback flame front will pass the burner deck and continue to propagate through said supply channel. Due to the fast combustion of the mixture in the supply channel, the quick expansion of the flashback flame may cause an explosive bang. Because the supply channel usually is narrow, the flame front will increase in speed inside the supply channel. When hydrogen is used as gaseous fuel this speed may even reach the sonic level resulting in an even better audible bang. Both bangs are most unwanted.

Therefore, an object of the invention is to provide a gas heater which alleviates the above mentioned problems.

To that end, the invention provides a gas heater according to claim 1. More particularly, the invention provides a gas heater comprising a premix burner, a supply channel and a check valve. The burner has a burner deck. The supply channel is fluidly connected to a supply of gaseous fuel, to a supply of air, and to the burner for supplying a mixture of the gaseous fuel and the air to the burner. The supply channel comprises a mixing area upstream of the burner in which mixing area, in operation, the gaseous fuel and the air start to mix. The check valve is placed in the supply channel downstream of the mixing area and upstream of the burner. The check valve comprises a valve seat and a moveable valve body. The valve body has a first end position in which the check valve is opened and in the direction of which the valve body is urged in a first pressure condition in which a pressure upstream from the valve is higher than a pressure downstream of the valve. The valve body has a second end position in which the check valve is closed and to which the valve body is urged in the event of a flashback. The configuration of the check valve is such that, after closure of the check valve due the flashback, the check valve remains closed for a delay time.

One solution to prevent a flashback would be to increase the mixture velocity, i.e. the flow velocity of the mixture when flowing through the burner deck of the burner. This has two disadvantages. Firstly it increases the chances of a blow-off. A blow-off is an occasion wherein the combustion flame is blown off the burner deck. As a consequence, the flame will extinguish or incomplete combustion will occur.

A second disadvantage of an increased mixture velocity would be that the pressure of the mixture supplied to the burner must be increased. A second disadvantage of an increased mixture velocity would be that the pressure of the mixture supplied to the burner must be increased. This requires heavier blowers.

With the solution according to the invention no extra or heavier blowers are needed, nor are the chances of a blow-off increased. By use of the check valve placed in the supply channel, flame fronts traveling in an upstream direction will effectively be stopped at the check valve.

When a flashback occurs, the flame wave front traveling in the upstream direction results in an increase of pressure downstream of the check valve leading to a second pressure condition, in which the pressure downstream of the check valve is higher than upstream of the check valve. This increase of pressure will quickly close the check valve so that the combustible mixture upstream of the check valve can not be ignited and does not combust. When the check valve is closed, the combustible mixture downstream of the check valve will continue to combust causing the pressure downstream of the check valve to decrease again. Upstream of the check valve, the mixture will continue to be supplied causing an increase in pressure upstream on said side of the check valve. Because of this continued supply, the pressure at the upstream side of the check valve will quickly be higher again than the pressure at the downstream side, urging the check valve in the direction of the first end position, in which the check valve is open. When the check valve would open immediately after the reversal from the second pressure condition to the first pressure condition, or due to bouncing of the valve body on the seat, the check valve would open before all of the combustible mixture downstream of the check valve is combusted. The burning fuel which is still present downstream of the check valve in the supply channel may ignite the mixture upstream of the check valve causing the flashback to further propagate upstream. This would render the check valve less effective. This effect of continued propagation of the flashback is mitigated by the feature that the check valve remains closed for a delay time. This delay time may be chosen such that all of the combustible mixture downstream of the check valve is indeed combusted before the check valve is open again. In this way the flashback may effectively be stopped at the check valve.

Also, by quickly closing the check valve, further propagation of the flashback wave may be stopped before it can reach a sonic speed. The unwanted bang of breaking the sound barrier is thus also not produced.

The terms upstream and downstream used in this description are used as relative to the normal flow of gasses within the gas heater, i.e. without the occurrence of a flashback.

The invention further provides a gas boiler for heating water, e.g. for central heating and/or tap water heating. The gas boiler comprises a gas heater according to any one of claims 1-13 and a heat exchanger with a combustion chamber. The premix burner of the gas heater is connected to the heat exchanger. The burner deck is positioned in the combustion chamber.

The effects and advantages of the gas boiler are the same as the effects and advantages of the gas heater.

The invention also relates to a method according to claim 14. More particularly, the invention relates to a method for operating a gas heater according to the invention. The method comprises:
providing a gas heater according to any one of claims 1-13;
supplying air and gaseous fuel to the supply channel;
mixing the air and the gaseous fuel and supply the at least partly mixed air and gaseous fuel via the check valve to the premix burner,
wherein during normal operation, in which a first pressure condition prevails in which a pressure upstream from the check valve is higher than a pressure downstream of the check valve, the check valve is opened;
wherein at the event of a flashback, the valve body is urged in the second end position in which the check valve is closed; and,
wherein after closure of the check valve due to flashback, the check valve remains closed for a delay time.

The effects and advantages of these methods are the same as the effects and advantages which are described above in relation to the gas heater according to the invention.

The present invention will be further elucidated with reference to figures of exemplary embodiments. The embodiments may be combined or may be applied separately from each other.

DETAILED DESCRIPTION OF THE FIGURES

In this application similar or corresponding features are denoted by similar or corresponding reference signs. The description of the various embodiments is not limited to the example shown in the figures and the reference numbers used in the detailed description and the claims are not intended to limit the description of the embodiments, but are included to elucidate the embodiments by referring to the example shown in the figures.

Figure 1:
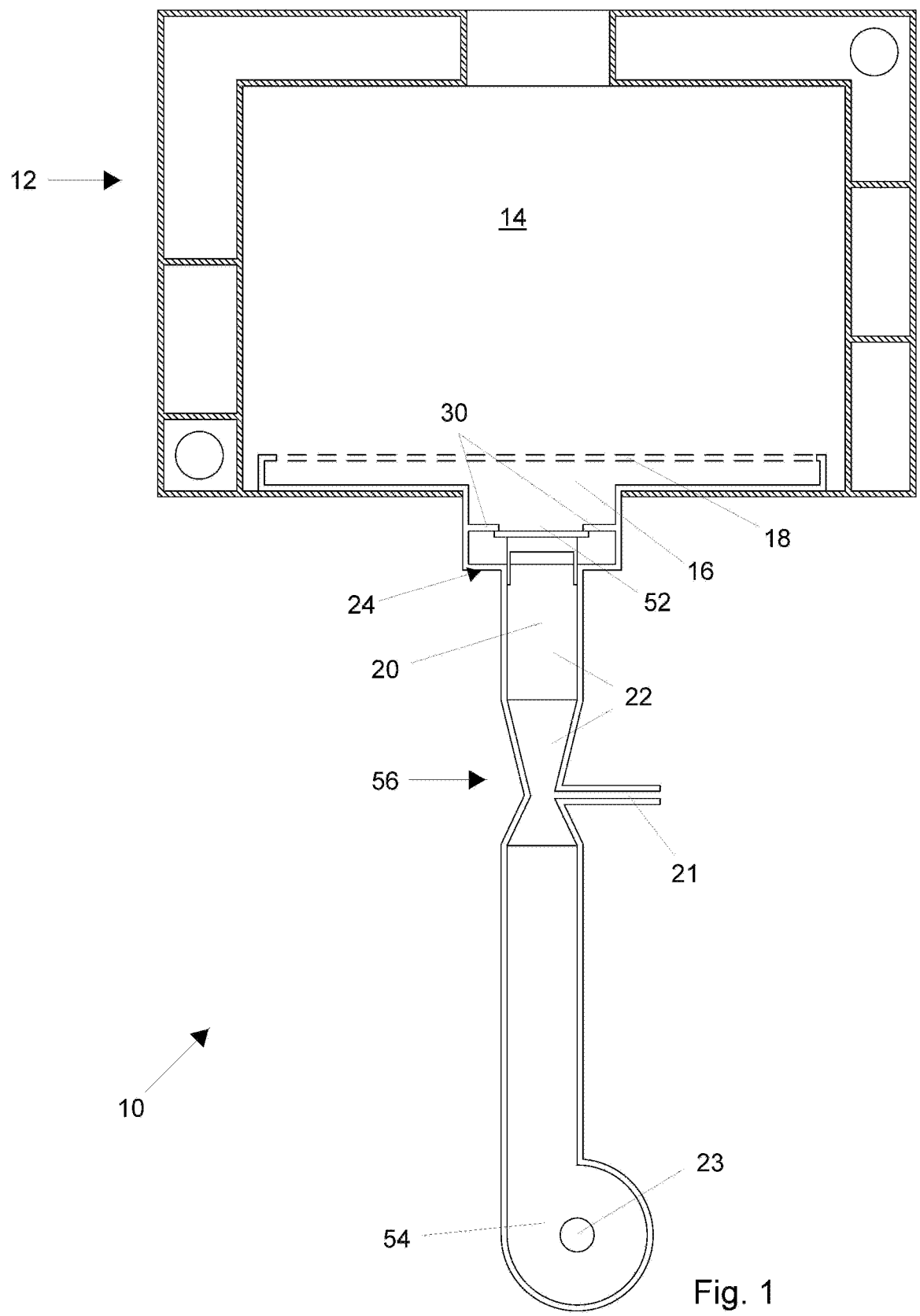
FIG. 1 shows a schematic cross section of an example of a gas boiler.
Figure 2:
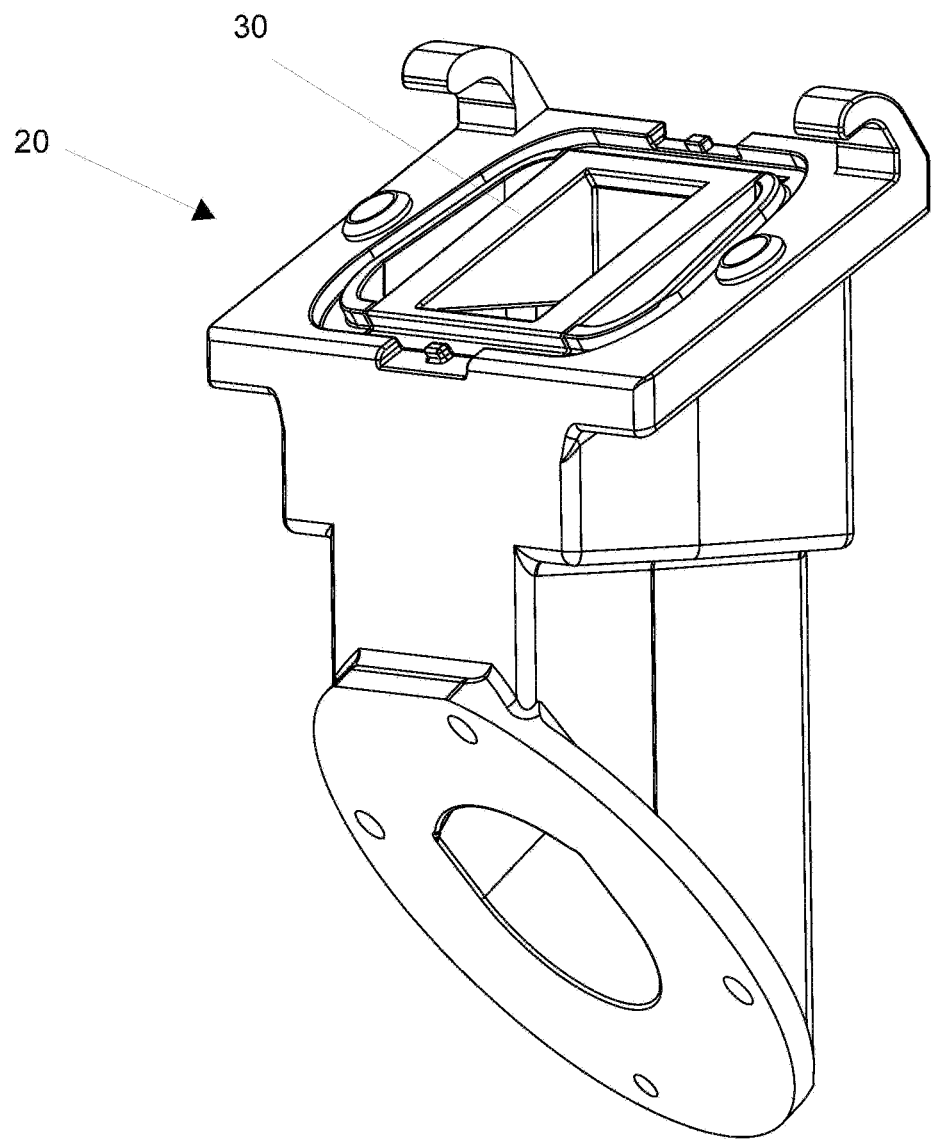
FIG. 2 shows a perspective view of an example of a supply channel comprising a check valve according to the invention.

In general, the invention relates to a gas heater. A schematic representation of an example of a gas heater, in this example placed in a gas boiler 10, is shown in FIG. 1. The gas heater according to the invention can also be used many purposes, for example for heating a liquid, a gas or other applications where heat is required, like ovens, outdoor cafés etc. The gas heater comprises a premix burner 16, a supply channel 20 and a check valve 24. The burner 16 has a burner deck 18. The supply channel 20 is fluidly connected to a supply 21 of gaseous fuel, to a supply 23 of air, and to the burner 16 for supplying a mixture of the gaseous fuel and the air to the burner 16. The supply channel 20 comprises a mixing area 22 upstream of the burner 16 in which mixing area 22, in operation, the gaseous fuel and the air start to mix. The check valve 24 is placed in the supply channel 20 downstream of the mixing area 22 and upstream of the burner 16. The check valve 24 comprises a valve seat 26 and a moveable valve body 28. The valve body 28 has a first end position in which the check valve 24 is opened and in the direction of which the valve body 28 is urged in a first pressure condition in which a pressure upstream from the check valve 24 is higher than a pressure downstream of the check valve 24. The valve body 28 has a second end position in which the check valve 24 is closed and to which the valve body 28 is urged in the event of a flashback. The configuration of the check valve 24 is such that, after closure of the check valve 24 due to flashback, the check valve 24 remains closed for a delay time.

The effects and advantages of the gas boiler 10 have been described in the summary section and these effects and advantages are inserted here by reference.

In normal use, the check valve 24 does not always have to be fully open, i.e the valve body 28 does not always have to be in the first end position. Even when the check valve 24 is partially open, i.e. the valve body 28 is near the first end position, the check valve 24 will allow the mixture to flow through the check valve 24.

The mixing area in the supply channel 20 starts where the gaseous fuel and air joined and continues downstream thereof. The mixing area may be provided with a mixing device 56, configured to form the mixture of the gaseous fuel and the air. The mixing area may then start at the mixing device 56. The gaseous fuel and the air may also join without the use of a dedicated mixing device 56. The air and the gaseous fuel may simply be joined upstream or downstream of a fan 54. They may even be joined in the fan 54.

In an embodiment, the delay time is sufficient to burn the gaseous fuel in the mixture which is present in the burner 16 and a part of supply channel 20 which is downstream of the check valve 24. The delay time is thus chosen such that substantially all of the combustible mixture downstream of the check valve 24 is indeed combusted before the check valve is open again. In this way the flashback may be stopped at the check valve 24.

In an embodiment, the gas heater is configured to use gaseous fuel which comprises hydrogen ($H_2$) in a mass concentration of at least 10%, preferably at least 50%, more preferably 100%. The gas heater according to the invention is not limited to use gaseous fuels comprising hydrogen. Any kind of combustible gas can be used as fuel, e.g. natural gas, methane, ethylene, propane, butane, coal gas, biogas etc. In this embodiment the gaseous fuel also comprises hydrogen. Any combination of hydrogen with e.g. natural gas can be used.

In an embodiment, the valve body 28 has a continuous movement range 34 (see FIG. 4) extending from the first end position 35 to the second end position 37. The continuous movement range 34 includes a first movement range part 36 extending from the second end position 37 in the direction of the first end position 35 up to an intermediate position 37, in which first movement range part 36 the check valve is substantially closed. The delay time is realized by a time of movement of the valve body 28 along the first movement range part 36 from the intermediate position 39 to the second end position 37 and back to the intermediate position 39. The continuous movement range 34 of the valve body 28 may include a second movement range part 38 extending form the first end position 35 in the direction of the second end position 37 up to the intermediate position 39, in which second movement range part 38 the check valve 24 is open.

The continuous movement range 34 of the valve body 28 provides an unlimited amount of intermediate positions between the first end position 35 and the second end position 37. In a first part 36 of this range 34, the check valve 24 is substantially closed. Substantially means that the check valve 24 is de facto closed, but because of the nature of a movable valve member 28 very small leakages across the check valve 24 may occur. Thus, when the valve body 28 is moved within this first movement range part 36, the check valve 24 is and remains closed. The continuous movement range 34 may also comprise the second movement range part 38 in which part the check valve 24 is open. Thus, when the valve body 28 is moved within this second movement range part 38, the check valve 24 is and remains open. When the valve body 28 moves from the second movement range part 38 to the first movement range part 36 the check valve 24 will close, and when the valve body 28 moves from the first movement range part 36 to the second movement range part 38 the check valve 24 will open. The delay time is thus the time it takes the valve body 28 to move from the intermediate position 39 to the second end position 37 and back to the intermediate position 39 again which forms the start of second movement range part 38.

Figure 6:
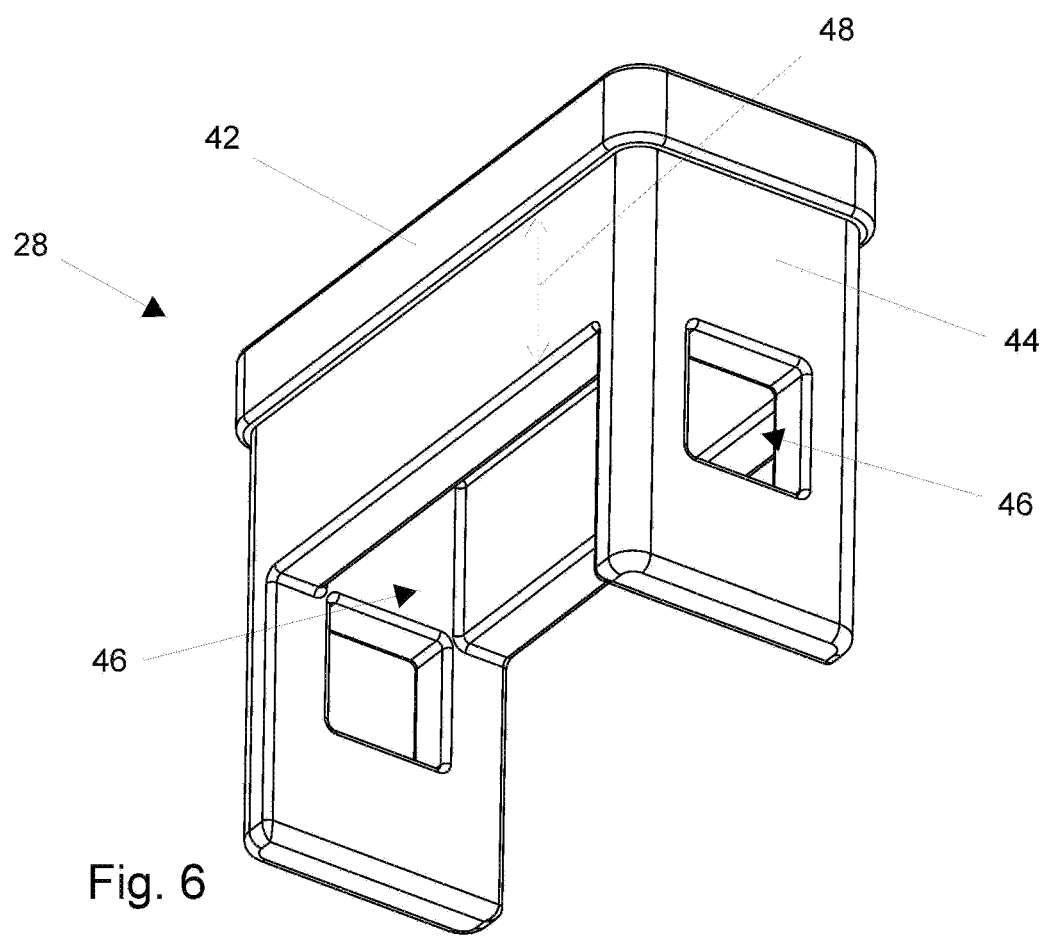
FIG. 6 shows a perspective view of the valve body of FIG. 5.

In an embodiment, the check valve 24 has an inlet opening 40 which is bounded by the valve seat 26. The valve body 28 (see FIG. 6) comprises a cover part 42, which in the second end position of the valve body 28 engages the valve seat 26. The valve body 28 further comprises a guide 44 connected to the cover part 42. The guide 44 snugly fits within the inlet opening 40 and allows movement of the valve body 28 relative to the valve seat 26. The guide 44 comprises at least one gas passage opening 46 which is positioned at a distance 48 from the cover part 42, such that during the movement of the valve body 28 from the second end position 37 to the first end position 35 said guide 44 slides in the inlet opening 40 causing the check valve 24 to remain closed during the delay time until the at least one gas passage opening 46 passes a downstream side of the valve seat 26. In an embodiment, the distance 48 between the at least one gas passage opening 46 and the cover part 42 may define the first movement range part 36 and thus the delay time.

Figure 3:
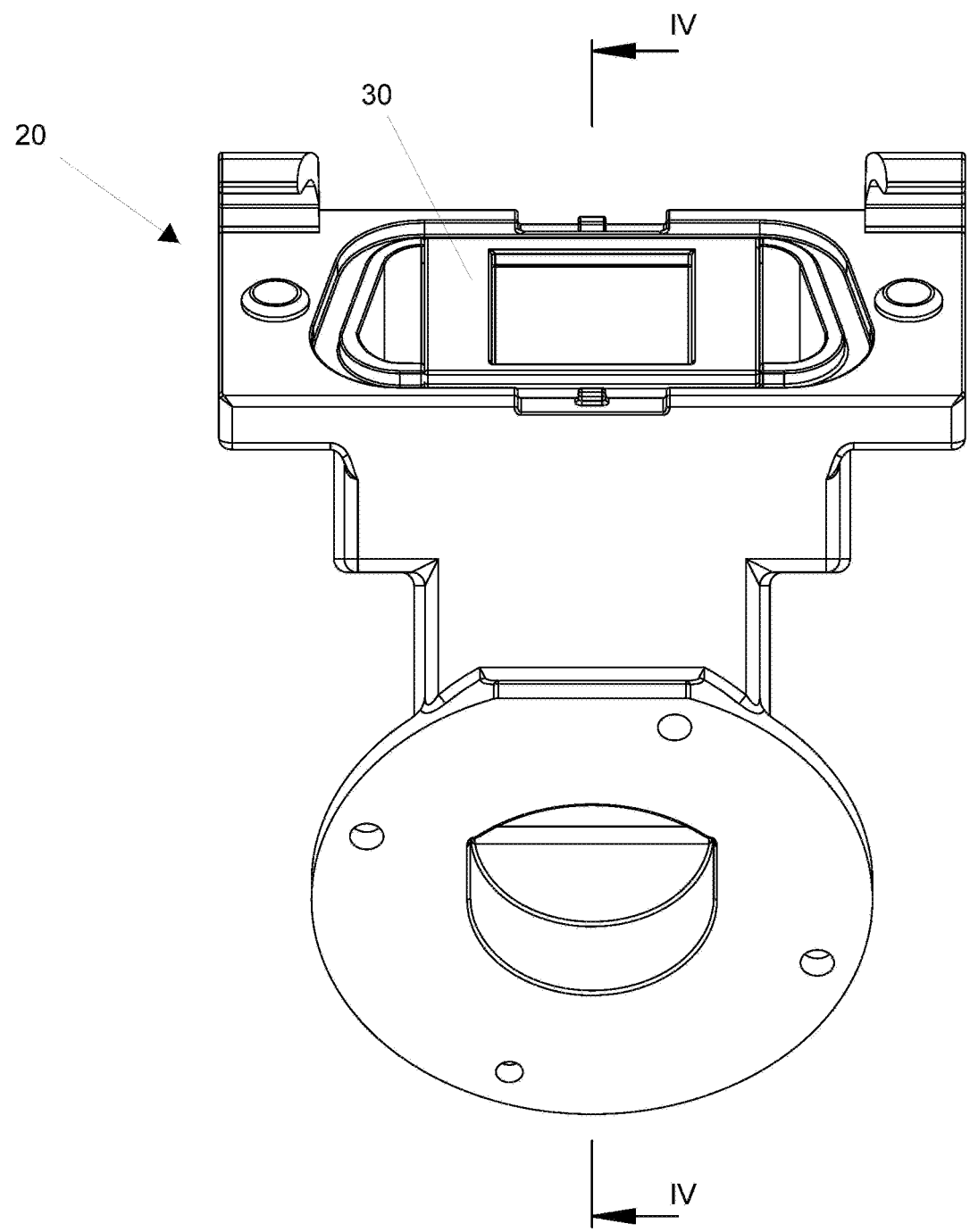
FIG. 3 shows a front view of the example of FIG. 2.
Figure 4:
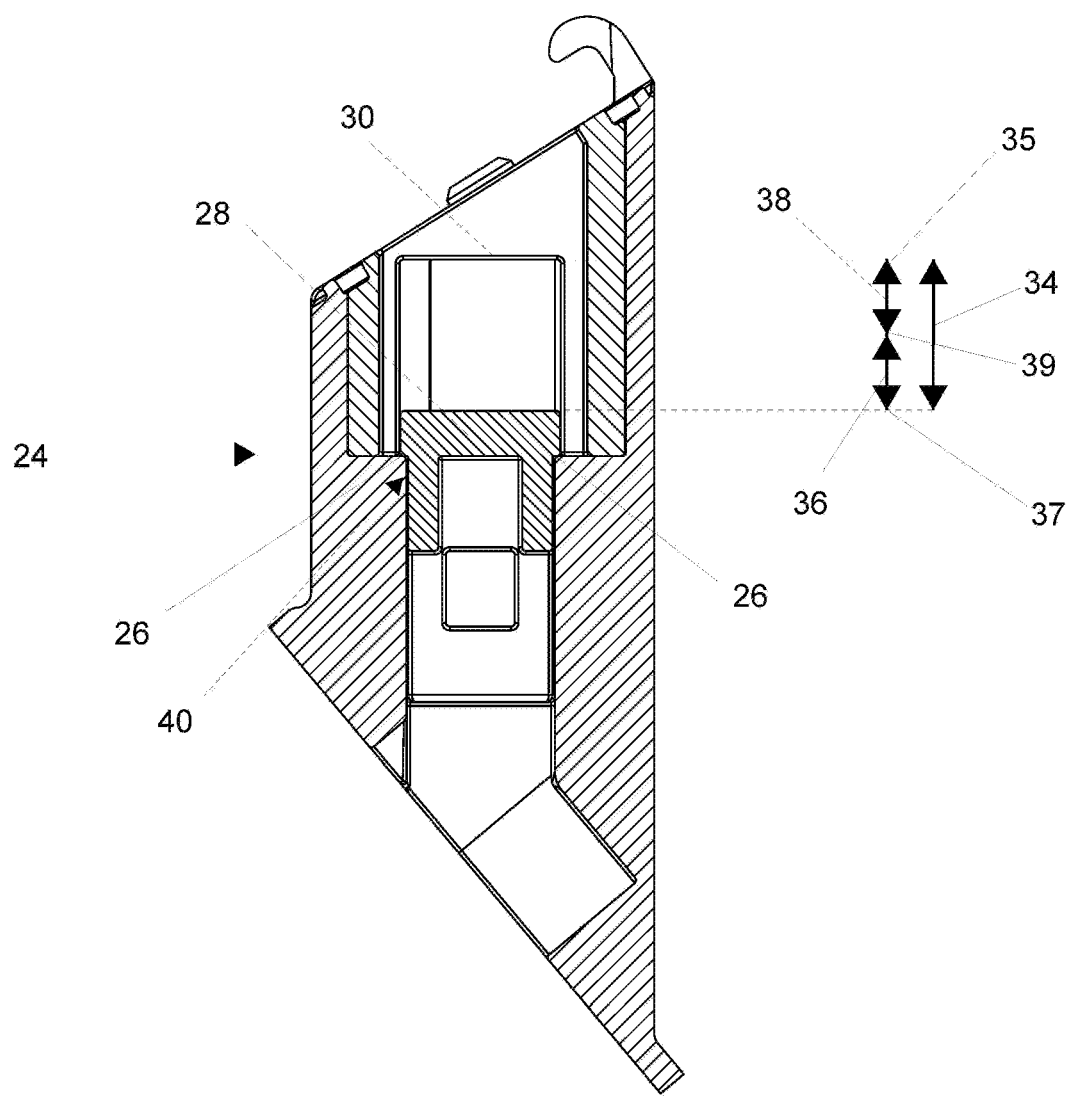
FIG. 4 shows a cross section view of the supply channel of FIG. 3 along line IV-IV with the check valve visible.
Figure 5:
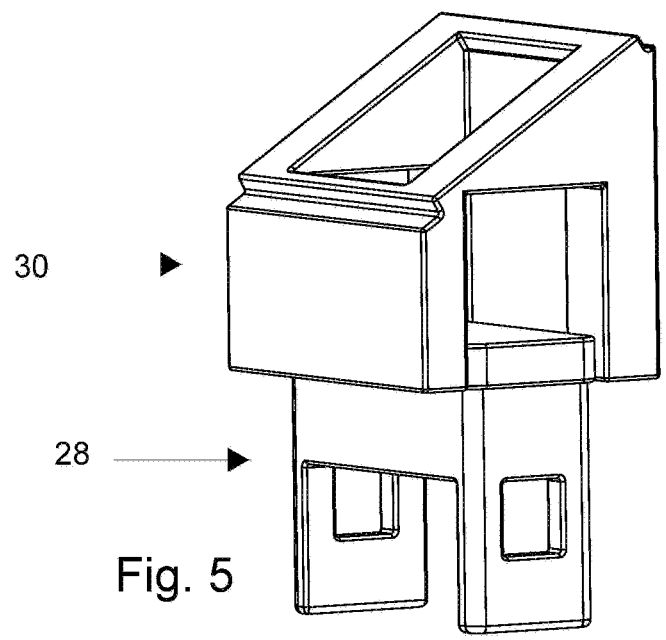
FIG. 5 shows a perspective view of an example of a valve body and a valve body stop according to the invention.

In this specific embodiment of the invention, which is shown in FIGS. 3-5, the movement of the guide 44 in the inlet opening 40 and past the valve seat 26 causes the delay time. When the valve body 28 is in the second end position 37 the cover part 42 engages the valve seat 26 thus closing off the inlet opening 40. This causes the check valve 24 to be closed. When the valve body 28 is in the first end position 35 the cover part 42 is spaced apart from the valve seat 26 and the gaseous fuel can pass the inlet opening 40, the at least one gas passage opening 46 so as to flow towards the burner 16. When the valve body 28 moves from the second end position 37 towards the first end position 35, the guide 44 will slide in the inlet opening 40. Because the guide 44 snugly fits within the inlet opening 40, the guide 44 closes off said inlet opening 40. This causes the check valve 24 to initially remain closed during the movement of the valve body 28 in the direction of the first end position. When the valve body 28 has moved over the distance 48 between the at least one gas passage opening 46 and the cover part 42, the gas passage opening 46 will have reached the downstream side of the valve seat 26. When the valve body 28 moves further, the gas passage opening 46 will pass said downstream side of the valve seat 26 and the mixture can pass the valve body 28 by flowing via the at least one gas passage opening 46 towards the burner 16. In this embodiment, the movement of the valve body 26 over the distance 48 between the at least one gas passage opening 46 and the cover part 42 is equal to the movement of the valve body 26 in the first movement range part 36. The check valve 24 may also comprise a valve body stop 30. The valve body stop 30 is placed such that in the first end position 35 the valve body 28 abuts the valve body stop 30 such that the valve body 28 can not move further away from the second end position 37. The valve body stop 30 thus bounds the continuous movement range 34 and determines the place of the second end position. The valve body stop 30 may be embodied as a cage in which the cover part 42 of the valve body 26 may move. The cage may comprise a cam or beam against which the cover part 42 abuts therewith bounding the movement of the valve body 26.

In the above described embodiment, the guide 44 and the inlet opening 40 may have a rectangular shape. A rectangular shape is particular advantageous for placement inside the supply channel 20 of most current available gas boilers. Furthermore, the valve body (28) may have an aerodynamically favorable upstream contour shape for guiding the mixture to the at least one gas passage opening 46. Such a contour shape decreases the flow resistance of the valve body 28 and thus decreases a force of the flow of gaseous fuel exerted on the valve body 26. This may increase the delay time thereby reducing the change of a flashback propagating past the check valve 24 in the upstream direction.

In an embodiment, the valve body 28 is biased to the second end position 37. The first end position 35 of the valve body 28 may be situated at a higher level than the second end position 37. The biasing of the check valve 24 may be achieved by gravity acting on the valve body 28.

By biasing the valve body 28 in the second end position, the check valve is closed by default. This provides an additional safety measure in addition to the delay time. By using gravity for the biasing no additional components are needed and the design or lay-out of the check valve can remain simple which is preferable cost-wise.

In an embodiment the check valve 24 is positioned close to a mixture inlet 52 of the burner 16, so that a volume which is present in the burner 16 and a part of the supply channel 20 which is downstream of the check valve 24 is sufficiently small to avoid a substantial bang in the event of a flashback. In this way the amount of gaseous fuel inside said part of the supply channel 20 is as small as possible. Such a configuration has the advantage that the flashback will be stopped sooner as would be the case with a bigger volume downstream of the check valve 24 because more mixture would be present in a bigger volume.

In an embodiment the gas heater further comprises a fan 54 for supplying the air or the mixture to the burner 16. The fan 54 may be placed upstream of the mixing area 22 and supplies the air to the mixing area 22. The invention also relates to a gas boiler 10 for heating water, e.g. for central heating and/or tap water heating. The gas boiler 10 comprises a gas heater according to the invention and a heat exchanger 12 with a combustion chamber 14. The premix burner 16 of the gas heater is connected to the heat exchanger 12, and the burner deck 18 is positioned in the combustion chamber 14.

The effects and advantages of the gas boiler have been described in the summary section.

Finally, the invention relates to method for operating a gas heater according to the invention. The method comprises: providing a gas heater according to any one of claims 1-13; supplying air and gaseous fuel to the supply channel 20; mixing the air and the gaseous fuel and supply the at least partly mixed air and gaseous fuel via the check valve 24 to the premix burner 16, wherein during normal operation, in which a first pressure condition prevails in which a pressure upstream from the check valve 24 is higher than a pressure downstream of the check valve 24, the check valve 24 is opened;

wherein at the event of a flashback, the valve body 28 is urged in the second end position 37 in which the check valve 24 is closed; and, wherein after closure of the check valve 24 due to flashback, the check valve 24 remains closed for a delay time.

For the advantages of the method, reference is made to the description thereof in the summary section above.

In an embodiment, the delay time may be chosen such that substantially all of the combustible mixture downstream of the check valve 24 is combusted before the check valve opens again. For example, the delay time may be at least 10 ms. This delay time is long enough for aborting the flash back.

The various embodiments which are described above may be used implemented independently from one another and may be combined with one another in various ways. The reference numbers used in the detailed description and the claims do not limit the description of the embodiments nor do they limit the claims. The reference numbers are solely used to clarify.

LEGEND

10—gas boiler
12—heat exchanger
14—combustion chamber
16—burner
18—burner deck
20—supply channel
21—supply of gaseous fuel
22—mixing area
23—supply of air
24—check valve
26—valve seat
28—valve body
30—valve body stop
34—continuous movement range
35—first end position
36—first movement range part
37—second end position
38—second movement range part
39—intermediate position
40—inlet opening
42—cover part
44—guide
46—gas passage opening
48—distance
52—mixture inlet (of the burner)
54—fan
56—mixing device

The invention claimed is:

1. A gas heater, comprising:
a burner having a burner deck;
a supply channel fluidly connected to a supply of gaseous fuel, to a supply of air, and to the burner for supplying a mixture of the gaseous fuel and the air to the burner, wherein the supply channel comprises a mixing area upstream of the burner, wherein in the mixing area, in operation, the gaseous fuel and the air start to mix; and
a check valve placed in the supply channel downstream of the mixing area and upstream of the burner, the check valve comprising a valve seat and a moveable valve body,
wherein the valve body has a first end position in which the check valve is opened and in the direction of which the valve body is urged in a first pressure condition in which a pressure upstream from the check valve is higher than a pressure downstream of the check valve,
wherein the valve body has a second end position in which the check valve is closed and to which the valve body is urged in the event of a flashback, and
wherein the configuration of the check valve is such that, after closure of the check valve due to flashback, the check valve remains closed for a delay time sufficient to burn the gaseous fuel in the mixture which is present in the burner and a part of the supply channel which is downstream of the check valve.

2. The gas heater according to claim 1, wherein the gas heater is configured to use gaseous fuel which comprises hydrogen ($H_2$) in a mass concentration of at least 10%.

3. The gas heater according to claim 1, wherein the valve body has a continuous movement range extending from the first end position to the second end position, wherein the continuous movement range includes a first movement range part extending from the second end position in the direction of the first end position up to an intermediate position, wherein in the first movement range part the check valve is substantially closed, and wherein the delay time is realized by a time of movement of the valve body along the first movement range part from the intermediate position to the second end position and back to the intermediate position.

4. The gas heater according to claim 3, wherein the continuous movement range of the valve body includes a second movement range part extending from the first end position in the direction of the second end position up to the intermediate position, wherein in the second movement range part the check valve is open.

5. The gas heater according to claim 1, wherein the check valve has an inlet opening which is bounded by the valve seat, wherein the valve body comprises a cover part, which in the second end position of the valve body engages the valve seat, and wherein the valve body further comprises a guide connected to the cover part, wherein the guide snugly fits within the inlet opening and allows movement of the valve body relative to the valve seat, wherein the guide comprises at least one gas passage opening which is positioned at a distance from the cover part, such that during the movement of the valve body from the second end position to the first end position said guide slides in the inlet opening causing the check valve to remain closed during the delay time until the at least one gas passage opening passes a downstream side of the valve seat.

6. The gas heater according to claim 5, wherein the valve body has a continuous movement range extending from the first end position to the second end position, wherein the continuous movement range includes a first movement range part extending from the second end position in the direction of the first end position up to an intermediate position, wherein in the first movement range part the check valve is substantially closed, wherein the delay time is realized by a time of movement of the valve body along the first movement range part from the intermediate position to the second end position and back to the intermediate position, and wherein the distance between the at least one gas passage opening and the cover part defines the first movement range part.

7. The gas heater according to claim 5, wherein the valve body has an aerodynamic upstream contour shape for guiding the mixture to the at least one gas passage opening.

8. The gas heater according to claim 1, wherein the valve body is biased to the second end position.

9. The gas heater according to claim 8, wherein the first end position of the valve body is situated at a higher level than the second end position, and wherein the biasing of the check valve is achieved by gravity acting on the valve body.

10. The gas heater according to claim 1, wherein the check valve is positioned close to a mixture inlet of the burner, so that a volume which is present in the burner and a part of the supply channel which is downstream of the check valve is sufficiently small to avoid a substantial bang in the event of a flashback.

11. The gas heater according to claim 1, further comprising a fan for supplying the air or the mixture to the burner.

12. The gas heater according to claim 11, wherein the fan is placed upstream of the mixing area and supplies the air to the mixing area.

13. A gas boiler for heating water, wherein the gas boiler comprises:
the gas heater according to claim 1; and
a heat exchanger with a combustion chamber,
wherein the burner of the gas heater is connected to the heat exchanger, and
wherein the burner deck is positioned in the combustion chamber.

14. A method for operating the gas heater according to claim 1, wherein the method comprises:
providing said gas heater;
supplying air and gaseous fuel to the supply channel; and
mixing the air and the gaseous fuel and supplying the at least partly mixed air and gaseous fuel via the check valve to the burner,
wherein during normal operation, in which the first pressure condition prevails in which the pressure upstream from the check valve is higher than the pressure downstream of the check valve, the check valve is opened, and
wherein at the event of a flashback, the valve body is urged in the second end position in which the check valve is closed; and, wherein after closure of the check valve due to flashback, the check valve remains closed for the delay time chosen such that substantially all of the combustible mixture downstream of the check valve is combusted before the check valve opens again.

15. The method according to claim 14, wherein the delay time is at least 10 ms.

16. The gas heater according to claim 1, wherein the gas heater is configured to use gaseous fuel which comprises hydrogen ($H_2$) in a mass concentration of at least 50%.

17. The gas heater according to claim 1, wherein the gas heater is configured to use gaseous fuel which comprises hydrogen ($H_2$) in a mass concentration of 100%.

18. The gas heater according to claim 1, wherein the valve body has a continuous movement range extending from the first end position to the second end position, wherein the continuous movement range includes a first movement range part extending from the second end position in the direction of the first end position to an intermediate position, wherein in the first movement range part the check valve is substantially closed, and wherein the delay time is realized by a time of movement of the valve body along the first movement range part from the intermediate position to the second end position and back to the intermediate position.

* * * * *